US012583533B2

(12) United States Patent
Segalini

(10) Patent No.: US 12,583,533 B2
(45) Date of Patent: Mar. 24, 2026

(54) ROAD VEHICLE PROVIDED WITH A CENTRAL AERODYNAMIC CHANNEL AND PROPER POWERTRAIN SYSTEM

(71) Applicant: FERRARI S.P.A., Modena (IT)

(72) Inventor: Alessandro Segalini, Modena (IT)

(73) Assignee: FERRARI S.P.A., Modena (IT)

( * ) Notice: Subject to any disclaimer, the term of this patent is extended or adjusted under 35 U.S.C. 154(b) by 273 days.

(21) Appl. No.: 18/360,500

(22) Filed: Jul. 27, 2023

(65) Prior Publication Data

US 2024/0034422 A1 Feb. 1, 2024

(30) Foreign Application Priority Data

Jul. 29, 2022 (IT) ........................ 102022000016143

(51) Int. Cl.
B62D 35/02 (2006.01)
B60K 7/00 (2006.01)
B60K 17/04 (2006.01)

(52) U.S. Cl.
CPC ............ B62D 35/02 (2013.01); B60K 7/0007 (2013.01); B60K 17/043 (2013.01); B60K 2007/0076 (2013.01); B60Y 2200/91 (2013.01)

(58) Field of Classification Search
CPC .... B62D 35/02; B60K 7/0007; B60K 17/043; B60K 2007/0076; B60Y 2200/91
See application file for complete search history.

(56) References Cited

U.S. PATENT DOCUMENTS

| | | |
|---|---|---|
| 2,612,964 A | 10/1952 | Edwin |
| 5,878,830 A | 3/1999 | Ruppert et al. |
| 6,575,522 B2 * | 6/2003 | Borghi ................... B62D 35/02 |
| | | 296/180.1 |
| 12,296,895 B2 * | 5/2025 | Aoyanagi .............. B62D 35/02 |
| 2004/0231315 A1 | 11/2004 | Gonzalez |
| 2011/0259657 A1 | 10/2011 | Fuechtner et al. |
| 2012/0043144 A1 | 2/2012 | Hwang |
| 2020/0055403 A1 | 2/2020 | Overstreet |

FOREIGN PATENT DOCUMENTS

| | | | |
|---|---|---|---|
| DE | 102007036093 A1 | 2/2009 | |
| EP | 2199137 A1 | 6/2010 | |
| EP | 3323652 A1 | 5/2018 | |
| JP | 2017121889 A * | 7/2017 | ........... B60K 7/0007 |

OTHER PUBLICATIONS

Italian Search Report for Application No. 102022000016143, Filing Date: Jul. 29, 2022; Date of Mailing: Mar. 22, 2023, 8 pages.

* cited by examiner

*Primary Examiner* — James J Taylor, II
(74) *Attorney, Agent, or Firm* — CANTOR COLBURN LLP

(57) ABSTRACT

Road vehicle comprising: four wheels, at least a pair of them being drive wheels; a passenger compartment configured to accommodate at least a driver; a vehicle body comprising a front portion and a rear portion relative to the passenger compartment along a travel direction; a powertrain system; a central aerodynamic channel at least partially arranged under the passenger compartment along a central longitudinal axis of the road vehicle; wherein the central aerodynamic channel seamlessly extends from a first aperture arranged in the area of the front portion to a second aperture arranged in the area of the rear portion of the vehicle body; wherein the powertrain system is at least partially arranged laterally to the central aerodynamic channel.

11 Claims, 5 Drawing Sheets

ROAD VEHICLE PROVIDED WITH A CENTRAL AERODYNAMIC CHANNEL AND PROPER POWERTRAIN SYSTEM

CROSS-REFERENCE TO RELATED APPLICATIONS

This patent application claims priority from Italian patent application no. 102022000016143 filed on Jul. 29, 2022, the entire disclosure of which is incorporated herein by reference.

TECHNICAL FIELD

The invention relates to a road vehicle provided with a central aerodynamic channel and a proper powertrain system.

In particular, the invention can advantageously, though not exclusively be applied to high-performance vehicles, to which explicit reference will be made in the description below without because of this losing generality.

BACKGROUND OF THE INVENTION

As it is known, the body of a road vehicle comprises the shell, namely the outermost parts of a motor vehicle, which are therefore visible to users, and the chassis, namely the structural inner part of the body.

Different types of powertrain systems are known for road vehicles, for example by means of electric motors, internal combustion engines or hybrid solutions.

The motors/engines are usually arranged, because of their weight, as centrally as possible and as close as possible to the vehicle floorboard, so as to lower the centre of gravity, optimizing the dynamics of the road vehicle.

Therefore, said one or more motors/engines, together with their reduction systems, if present, are generally arranged along a longitudinal, central axis of the road vehicle.

These configurations have the further advantage of featuring one or more motors/engines whose rotation axis is parallel to the rotation axis of the wheels (of a vehicle which is supposed to travel along a straight line). By so doing, motion is transmitted by the motors/engines in a simple manner.

However, the Applicant found out that these configurations pose limits from an aerodynamic point of view, meaning that the aerodynamics of the vehicle has to be designed starting from the assumption that the longitudinal and central area of the vehicle is at least partly occupied by the powertrain system.

Therefore, prior art solutions do not allow manufacturers to overcome some aerodynamic limits in order to improve consumptions and/or track performances, thus limiting designers' freedom and, consequently, limiting the possibility of optimizing air flow management and aesthetic qualities.

Generally speaking, these limits need to be overcome.

DESCRIPTION OF THE INVENTION

The object of the invention is to provide a road vehicle provided with a central aerodynamic channel and a proper powertrain system, which is at least partially free from the drawbacks described above and, at the same time, is simple and economic to be manufactured.

According to the invention, there is provided a road vehicle provided with a central aerodynamic channel and a proper powertrain system as claimed in the independent claims attached hereto and, preferably, in any one of the dependent claims directly or indirectly depending on the independent claims.

The appended claims describe preferred embodiments of the invention and form an integral part of the description.

BRIEF DESCRIPTION OF THE DRAWINGS

Hereinafter, some embodiments of the invention will be described, in order to allow the latter to be better understood, by way of non-limiting example and with reference to the accompanying drawings, wherein.

EMBODIMENTS OF THE INVENTION

Figure 1:
FIG. 1 is a schematic front view, with details left out for greater clarity, of a possible embodiment of a road vehicle according to the invention.

In FIG. 1, number 1 indicates, as a whole, a road vehicle provided with two front wheels 2 and with two rear wheels 2 (in particular, drive wheels). The vehicle 1 is provided with a passenger compartment 3, which is designed to accommodate at least one driver and, preferably, one or more passengers.

In the figures, the same numbers and the same reference letters indicate the same elements or components with the same function.

For the purposes of the invention, the term "second" component does not imply the presence of a "first" component. As a matter of fact, these terms are only used as labels to improve clarity and should not be interpreted in a limiting manner.

The elements and features contained in the different preferred embodiments, drawings included, can be combined with one another or be isolated from one another, without for this reason going beyond the scope of protection of this patent application, as described hereinafter.

The road vehicle 1 comprises a body 4, which comprises a chassis (which is known and, therefore, is not disclosed in detail) and a shell 5 fixed to the chassis, which has both an aesthetic function and an aerodynamic function and is usually visible from the outside of the road vehicle 1.

As it usually is the case in the automotive industry, the chassis delimits an inside of the vehicle 1 relative to an outside thereof, as well as a plurality of typical compartments, namely an engine compartment, the passenger compartment 3 and a luggage compartment or trunk to store luggage.

The road vehicle 1 (in particular the body 4) is provided with a front portion 6 and with a rear portion 7 according to its travel direction D, which is shown in FIG. 1 along a straight longitudinal axis A. In other words, the front portion 6 corresponds to the front of the road vehicle 1, in particular in the area of a front bumper 8, and the rear portion 7 corresponds to the back of the road vehicle 1, in particular in the area of a rear bumper 9.

Furthermore, the road vehicle 1 comprises a powertrain system 10, which is configured to deliver a torque to at least two wheels 2 of a same front and/or rear axis 11, 12.

In some non-limiting cases, which are not shown herein, the powertrain system 10 comprises an internal combustion engine.

In other non-limiting cases, like the ones shown in the accompanying figures, the powertrain system 10 comprises one or more electric actuator systems 13.

In particular, the powertrain system 10 comprises at least two electric actuators systems 13, each comprising at least one electric motor 14 and respective motion transmission elements 15 configured to transmit the motion of each electric motor 14 to at least one drive wheel 2 by means of a respective axle shaft 16.

Advantageously, though not necessarily, the powertrain system 10 comprises a respective electric actuator system 13 for each wheel 2 of the road vehicle 1 (in particular, four electric actuator systems 13, two for each axle 11, 12).

Advantageously, the road vehicle 1 comprises a central aerodynamic channel 17 at least partially arranged under the passenger compartment 3 along a central longitudinal axis A of the road vehicle 1.

In particular, the central aerodynamic channel 17 seamlessly extends from a first aperture 18 arranged in the area of the front portion 6 (in detail, also obtained on the front bumper 8) to a second aperture 19 arranged in the area of the rear portion 7 (in detail, also obtained on the rear bumper 9) of the vehicle body 4.

In detail, the word "seamlessly" means without significant changes for the air flow flowing through the aerodynamic channel 17 from side to side. In other words, the central aerodynamic channel lacks at least partially obstructing elements, such as filters, fans and obstacles, for the main part of its section.

Figure 2:
FIG. 2 is a schematic plan view, with details left out for greater clarity, of the vehicle of FIG. 1.
Figure 3:
FIG. 3 is a schematic perspective view of a front portion of the vehicle of FIG. 1 comprising a transparent part to point out the powertrain system.
Figure 4:
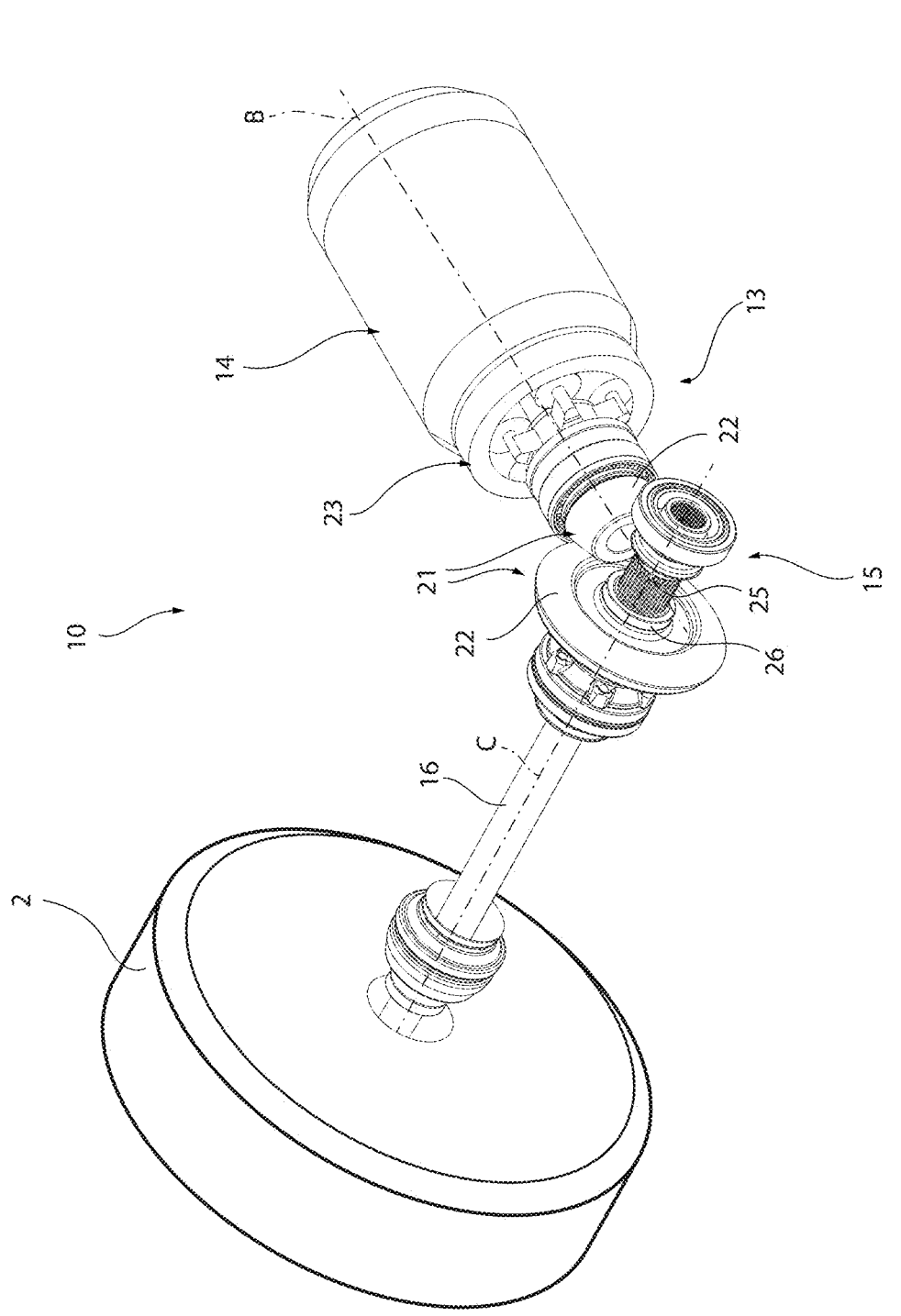
FIG. 4 is a schematic perspective view of a part of the powertrain system shown in FIG. 3.

In this way, both the front impact and the air resistance of the road vehicle 1 are reduced, thus allowing, thanks to the channel 17, for the passage of an air flow F (FIGS. 2 and 3).

In particular, the front portion 6 is the part of the body 4 that frontally hits the air ahead of the road vehicle 1. More in particular, the first aperture 18 is arranged, on the front portion 6, so as to extend on a substantially front (and vertical) portion of the bumper 8.

The space of the vehicle 1 where the central aerodynamic channel 17 is located is usually occupied by the respective powertrain systems, whatever they are. In order to overcome this incompatibility, the powertrain system 10 is at least partially arranged on the side of the central aerodynamic channel 17 (namely, transversely to the side along a transverse axis T of the road vehicle 1).

Therefore, in particular, each electric motor 14 is arranged on the side of the central aerodynamic channel 17, in the area of (preferably, fixed to) a vehicle bottom 20. Advantageously, though not in a limiting manner, the electric motors 14 are arranged at a distance that is equal to or smaller than 500 mm, in particular 200 mm, more in particular 100 mm, preferably smaller than 50 mm, from the central aerodynamic channel 17.

By so doing, the dissipation and, hence, the cooling of the electric motors 14 surprisingly improves.

Therefore, the closeness to the central aerodynamic channel 17, where air flows that can be used for cooling purposes, maximizes this dissipation effect.

Advantageously, though not in a limiting manner, in order to keep the centre of gravity of the vehicle 1 as low as possible, the powertrain system 10 is at least partially (in particular, totally) arranged at the same height from the ground or the vehicle bottom 20 as the central aerodynamic channel 17. In this way, the powertrain system 10 does not invade the space reserved for the passenger compartment 3.

Therefore, the central aerodynamic channel 17 is preferably, though not in a limiting manner, arranged under a central tunnel located inside the passenger compartment 3 (which is known and, hence, is not shown).

In the non-limiting embodiments of the accompanying figures, the electric actuator systems 13 at least partly, in particular totally, extend parallel to the central aerodynamic channel 17.

Hence, advantageously, though not necessarily, each electric motor 14 is arranged so as to have a respective first rotation axis B parallel to the central longitudinal (symmetry) axis A and, thus, to the central aerodynamic channel 17.

In some preferred non-limiting cases, like the ones shown in FIGS. 2 to 5, the motion transmission elements 15 are configured to transfer the motion of each electric motor 14 from the first rotation axis B, which is parallel to the central longitudinal axis A, to a second rotation axis C, which is transverse to the first rotation axis B and, in particular, though not in a limiting manner, is parallel to the transverse axis T of the road vehicle 1. In particular, the rotation axis B is the axis around which the respective axle shafts 16 and, hence, the drive wheels 2 rotate. Therefore, in this way, the motion of the electric motors 14 is transmitted from an axis B, which is parallel to the travel direction D and, hence, to the central longitudinal axis A of the road vehicle 1, to an axis C, which is transverse to the axis A and, in particular, is parallel to the transverse axis T and is concordant with the rotation of the wheels (in detail, of the relative hubs).

In detail, though not in a limiting manner, the motion transmission elements 15 each comprise bevel elements 21 for an angular transmission of the motion of the motor 14. For instance, the bevel elements 21 are gears 22, whose teeth were not drawn in accompanying figures in order to make the drawing more easily understandable.

Advantageously, though not necessarily, the transmission elements 15 of each electric actuator system 13 comprise a reduction element 23, in particular an epicyclic element, configured to reduce the output rotation speed of the electric motor 14, though maintaining the motion along the first rotation axis B. By so doing, the wheels 2 receive a rotation speed that is smaller than the one of the electric motors 14, thus simplifying the control thereof and reducing their delivered torque.

In the non-limiting embodiments of the accompanying figures, the electric actuator systems 13 are L-shaped, the part of the L parallel to the axis A corresponding to the electric motor 14 and to part of the transmission elements 15 (namely, to the reduction element 23 and to one of the bevel gears 22).

Figure 5:
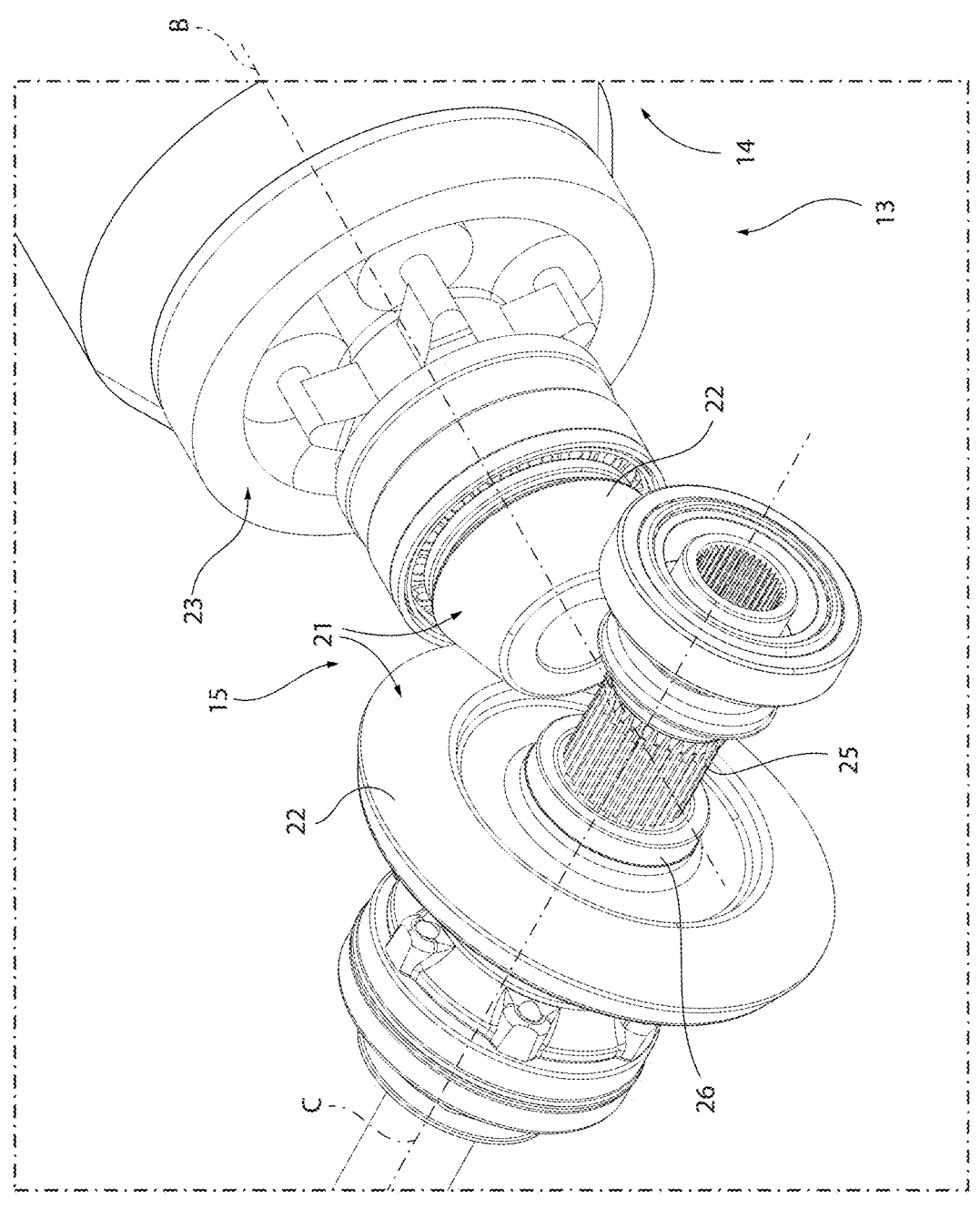
FIG. 5 is a schematic perspective view of a detail of the part of FIG. 4.

In the non-limiting embodiment of FIG. 5, the transmission elements 15 further comprise a splined shaft 25 configured to spline a ring gear 26 of the bevel gear 22 rotating around the second rotation axis C. In other non-limiting cases, which are not shown herein, the ring gear 25 is welded to the bevel gear 22, which rotate around the second rotation axis C.

According to the non-limiting embodiment of FIG. 2, the powertrain system 10 comprises four different electric actuator systems 13, each comprising at least one electric motor 14 and respective motion transmission elements 15, wherein the electric motors 14 are arranged two on the right and two on the left of the central aerodynamic channel 17.

Advantageously, though not in a limiting manner, for reasons concerning the centre of gravity, the electric motors 14 are arranged closer to the longitudinal centerline of the body 4 (namely closer to the centre of gravity of the vehicle 1), whereas the motion transmission elements 15 are arranged, relative to the electric motors 14, closer to the front portion 6 and closer to the rear portion 7, respectively.

According to further non-limiting embodiments, which are not shown herein, the powertrain system 10 comprises one single electric motor 14 (or, if necessary, one single heat engine) arranged on the side, in an asymmetrical manner, relative to the central aerodynamic channel 17 and connected to a suitable differential.

According to other non-limiting embodiments, which are not shown herein, the powertrain system 10 comprises one or more motors 14 arranged above the central aerodynamic channel 17, wherein the transmission elements 15 deliver anyway the motion to the respective drive wheels 2 going around the central aerodynamic channel 17.

According to some non-limiting embodiments, as shown in FIG. 1, the central aerodynamic channel 17 comprises a downforce element 24 to allow the vehicle 1 to maximize track performances.

In particular, the downforce element 24 is an at least partial lower closure (which does not necessarily have to be integral and continuous) of the aerodynamic channel 17, which would otherwise be open downwards. In this way, by changing the conformation of the downforce element 23, the road vehicle 1 is pressed down to the ground while driving on a track above given speeds (which cannot usually be reached on public roads).

In use, the electric motors 14 rotate around the first axes B and their motion goes through the reduction elements 23, the bevel elements 21 and the axle shafts 16 in order to reach the drive wheels 2.

Even though the invention described above specifically relates to a precise embodiment, it should not be considered as limited to said embodiment, for its scope of protection also includes all those variants, changes or simplifications covered by the appended claims, such as for example a different type of road vehicle (for instance, a front-drive vehicle or a rear-drive vehicle), a different shape of the transmission elements, a different conformation of the central aerodynamic channel, etcetera.

The vehicle described above has numerous advantages.

First of all, the central channel improves consumptions by reducing the front impact area of the vehicle and maximizes performances by increasing downforce.

Furthermore, the vehicle described above indicates how to free the central area along the longitudinal axis in order to make room for the aerodynamic channel. In particular, though not in a limiting manner, by dividing the powertrain system into several electric motors arranged on the sides of the channel.

A further advantage of the invention lies in the fact that unsprung masses are not increased (which, on the contrary, is the case with solution involving electric motors inside the wheels).

Finally, the vehicle described above does not change the steering system, which remains substantially identical to known models.

LIST OF THE REFERENCE NUMBERS OF THE FIGURES 1 vehicle
2 wheels
3 passenger compartment
4 body 5 shell
6 front portion
7 rear portion
8 front bumper
9 rear bumper
10 powertrain system
11 front axle
12 rear axle
13 electric actuator system
14 electric motor
15 transmission elements
16 axle shaft
17 central aerodynamic channel
18 first aperture
19 second aperture
20 vehicle bottom
21 bevel elements
22 gears
23 reduction element
24 downforce element
25 splined shaft
26 ring gear
A longitudinal axis
B first rotation axis
C second rotation axis
D travel direction
F air flow
T transverse axis

The invention claimed is:

1. A road vehicle (1) comprising:
four wheels (2), of which at least one pair of wheels (2) is driven;
a passenger compartment (3) configured to accommodate at least a driver;
a vehicular body (4) comprising a front portion (6) and a rear portion (7) relative to the passenger compartment (3) along a travel direction (D);
a powertrain system (10); and
a central aerodynamic channel (17) arranged at least partially below the passenger compartment (3) along a central longitudinal axis (A) of the road vehicle (1);
wherein the central aerodynamic channel (17) extends seamlessly from a first aperture (18) arranged at the front portion (6) to a second aperture (19) arranged at the rear portion (7) of the vehicular body (4);
wherein the powertrain system (10) is arranged at least partially laterally to the central aerodynamic channel (17);
wherein the powertrain system (10) comprises at least two electric actuators systems (13) comprising, each, at least one electric motor (14) and respective motion transmission elements (15) configured to transmit the motion of each electric motor (14) to at least one drive wheel (2) via a respective drive axle shaft (16);
wherein the electric motors (14) are arranged at a distance that is equal to or smaller than 500 mm from the central aerodynamic channel (17).

2. The road vehicle (1) according to claim 1, wherein each of the electric motors (14) extend parallel and lateral to the central aerodynamic channel (17).

3. The road vehicle (1) according to claim 2, wherein each electric motor (14) is arranged to have a respective first rotation axis (B) parallel to the central longitudinal axis (A) and thus to the central aerodynamic channel (17).

4. The road vehicle (1) according to claim 3, wherein each electric actuator system comprises a respective one of the motion transmission elements configured to transfer the motion of each electric motor (14) from the first rotation axis (B) parallel to the central longitudinal axis (A) to a second axis (C) of rotation parallel to a transverse axis (T) of the road vehicle (1).

5. The road vehicle (1) according to claim 4, wherein each motion transmission element (15) comprises conical elements (21) for an angular transmission of motion.

6. The road vehicle (1) according to claim 3, wherein the motion transmission elements (15) comprise a reduction element (23) configured to reduce the rotational speed exiting the electric motor while maintaining motion along the first rotation axis (B).

7. The road vehicle (1) according to claim 1, wherein each electric motor (14) is arranged laterally to the central aerodynamic channel (17) at a vehicular bottom (20).

8. The road vehicle (1) according to claim 1, wherein the powertrain system (10) is arranged at least partially at the same height above the ground as the central aerodynamic channel (17).

9. The road vehicle (1) according to claim 1, wherein the powertrain system (10) comprises four different electric actuator systems (13), each comprising at least one electric motor (14) and respective motion transmission elements (15), wherein the electric motors (14) are arranged two to the right and two to the left of the central aerodynamic channel (17).

10. The road vehicle (1) according to claim 9, wherein the electric motors (14) are arranged closer to the central longitudinal axis (A) of the body (4) than the motion transmission elements (15).

11. The road vehicle (1) according to claim 1, wherein the central aerodynamic channel (17) is at least partially inferiorly bounded by at least one downforce element (24).

* * * * *